United States Patent
Wissing

(10) Patent No.: US 6,685,789 B1
(45) Date of Patent: Feb. 3, 2004

(54) METHOD FOR THE MANUFACTURE OF LAMINATED THERMOFORMING

(76) Inventor: Gerhard Wissing, Tettnanger Strasse 35, D-88085 Langenargen (DE)

(*) Notice: Subject to any disclaimer, the term of this patent is extended or adjusted under 35 U.S.C. 154(b) by 1,446 days.

(21) Appl. No.: 08/836,940

(22) PCT Filed: Nov. 24, 1995

(86) PCT No.: PCT/EP95/04641

§ 371 (c)(1),
(2), (4) Date: May 12, 1997

(87) PCT Pub. No.: WO96/16788

PCT Pub. Date: Jun. 6, 1996

(30) Foreign Application Priority Data

Nov. 25, 1994 (DE) .......................................... 44 41 986
May 26, 1995 (EP) ............................................ 95108064

(51) Int. Cl.$^7$ ......................... B32B 31/00; B29C 51/14; B29C 51/10
(52) U.S. Cl. .................. 156/212; 156/214; 156/221; 156/245; 156/285; 156/309.9; 156/322; 264/257; 264/510; 264/511; 264/571
(58) Field of Search ....................... 156/212, 214, 156/221, 245, 285, 308.2, 309.9, 322, 382, 475, 500; 264/510, 511, 571, 257, 319

(56) References Cited

U.S. PATENT DOCUMENTS

| | | | |
|---|---|---|---|
| 3,446,686 A | | 5/1969 | Butler et al. |
| 3,576,703 A | | 4/1971 | Baker et al. |
| 3,616,197 A | | 10/1971 | Amberg et al. |
| 3,962,392 A | * | 6/1976 | Conner, Jr. |
| 4,114,213 A | * | 9/1978 | Beernaerts et al. ..... 156/285 X |
| 4,435,240 A | * | 3/1984 | Knaus et al. ........... 156/245 X |
| 4,740,417 A | | 4/1988 | Tornero |
| 4,744,848 A | * | 5/1988 | Andrews et al. ........ 264/257 X |
| 4,888,234 A | | 12/1989 | Smith et al. |
| 5,164,254 A | * | 11/1992 | Todd et al. .......... 156/308.2 X |
| 5,487,804 A | * | 1/1996 | Thevenet ............. 156/309.9 X |
| 5,743,979 A | * | 4/1998 | Lorbiecki ............... 156/212 X |

FOREIGN PATENT DOCUMENTS

| | | |
|---|---|---|
| DE | 2846453 | 5/1980 |
| DE | 3127253 | 6/1982 |
| DE | 4441986 | 5/1996 |
| EP | 0300521 | 1/1989 |
| EP | 0535118 | 4/1993 |
| EP | 0547664 | 6/1993 |
| GB | 2241194 | 8/1991 |
| JP | 61255837 | * 11/1986 |
| JP | 403207631 | * 9/1991 |

OTHER PUBLICATIONS

Patent Abstracts of Japan, vol. 010 No. 073 (M–463), Mar. 22, 1986 and JP, A, 60 217129 (Mitsui Toatsu Kagaku KK) Oct. 30, 1985.

* cited by examiner

*Primary Examiner*—Jeff H. Aftergut
(74) *Attorney, Agent, or Firm*—Bachman & LaPointe, P.C.

(57) ABSTRACT

Method of manufacturing a laminated thermoforming which consists of a thermoformable plastic resin, resin mixtures or a resin matrix as substrate material of the thermoforming and at least one deformable backing material. The pressure and temperature conditions of the thermoforming are adjusted so that the substrate material and backing material are undetachably connected to each other directly by incorporation and/or melting together, and increasing the pressing pressure by additional compressed air support.

21 Claims, 4 Drawing Sheets

METHOD FOR THE MANUFACTURE OF LAMINATED THERMOFORMING

Figure 1:
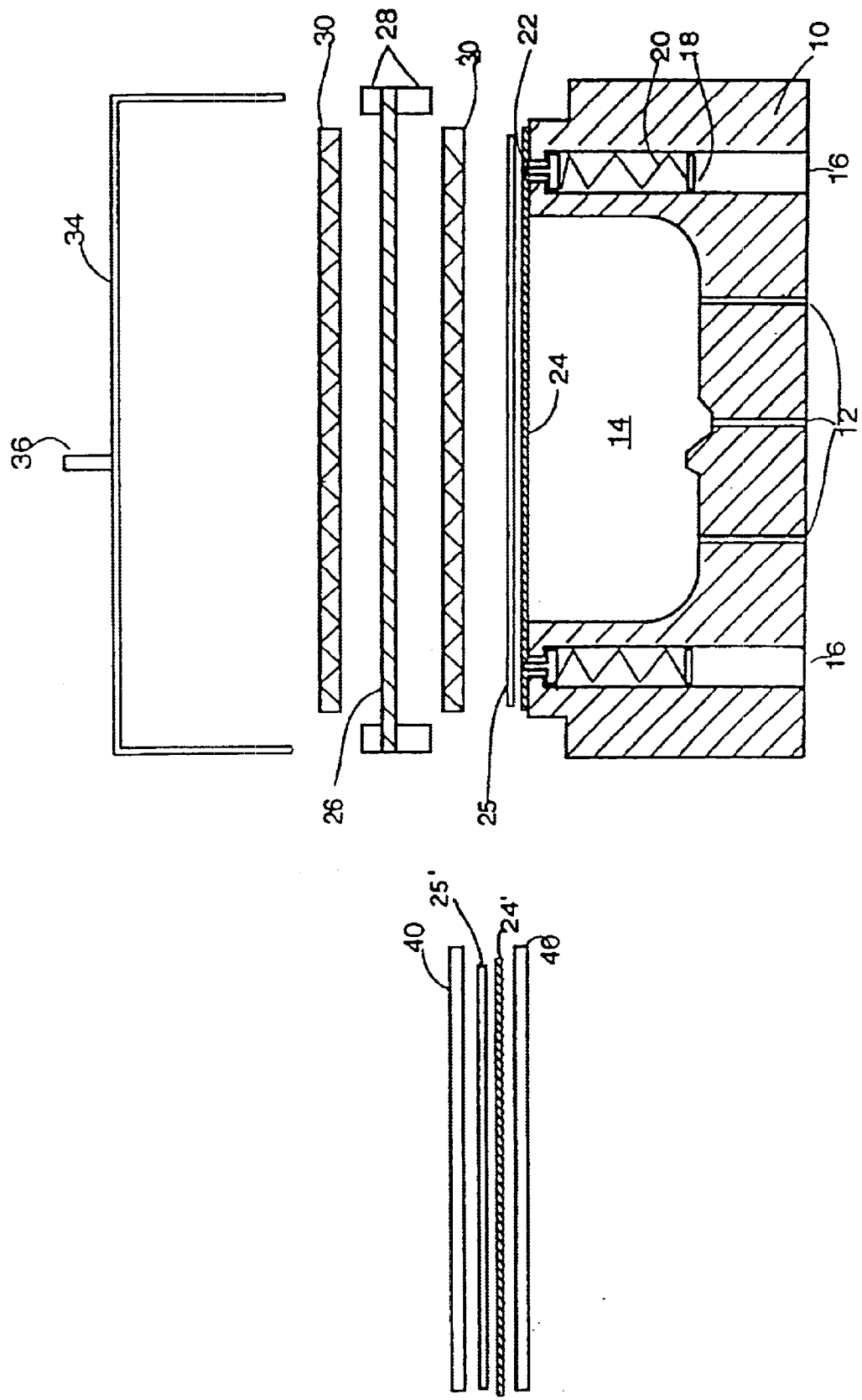

The present invention relates to a method of manufacturing a laminated thermoforming which consists of a thermoformable thermoplastic resin, resin mixtures, or a resin matrix as substrate material of the thermoforming and at least one deformable backing material.

The present known methods in which laminating is effected in particular in order to improve the optical appearance or the thermal insulation and in which foils, nonwovens, textiles or foams are used as backing material comprise, inter alia, the subsequent backing of a substrate part with the use of additional adhesive, direct back spraying in the low-pressure method, direct back embossing in the compression-injection method, direct back-foaming in the foaming method and thermoforming.

Further methods which are known and possible at the present time in which metallic and/or electric conductive structures are applied to or in the plastic, in particular in order to improve or produce electromagnetic screening are, among others, the subsequent integrating of a metal fabric by special constructions in the entire part, by the working of conductive polymers in the injection molding process, by coating with conductive varnishes, by lining with metallic foils, by vapor deposition with aluminum, or by electrochemical/galvanotechnical coating.

Furthermore, a screening material capable of deep drawing is available on the market as multiple-sandwich material of EVA non-woven fiber and metal non-woven fiber especially for EMI screening, the EVA non-woven fiber serving as thermoplastic adhesive and the metal non-woven fabric consisting of an alloy which melts upon the processing.

From German Utility Model G 92 16 080.8, a deep-drawing part of thermodeformable thermoplastic resin, resin mixture, or a resin matrix is known which consists of a fiber-reinforced polypropylene or polyethylene or a corresponding copolymer.

By the properties described in said utility model, this deep-drawing part finds many fields of use, including ones in which, in addition to the technical function, optical and decorative requirements and/or noise-dampening, insulating, electrical, electromagnetic or stability requirements exist which cannot be satisfied without additional surface treatment.

From German Patent Application DE 42 11 077 a method is known for the production of a molding having a structured surface in which a decoration substrate is first of all inserted into a deep-drawing mold, a plastic plate is introduced for the drawing of a molding, heated to forming temperature and then pulled into the mold by vacuum in the region of the deep-drawing mold. In this connection, the side facing the plastic molding should be at least partially material-locked in a surface layer of the plastic molding.

This method has the disadvantage that this material-locked connection cannot be obtained to a sufficient extent in all cases of use. In particular, in the event of larger deformations such as deep troughs and difficult geometry of the molded parts, such as undercuts, the required shaping and/or connection cannot be reliably obtained. Furthermore, the known method cannot be reliably used in the case of decoration materials of little or no air permeability since uncontrollable inclusions of air can remain between the plastic panel and the decorative material.

It is an object of the present invention to provide an inexpensive method for the simple manufacture of thermoformed parts which are backed on at least one side and consist of heat-deformable thermoplastic resin material, in which a dependable connection is obtained between the deformed plastic panel and the backing web and which is suitable both for backing materials for decorative or insulating purposes as well as materials of metal or other high-strength materials.

This object is achieved by the invention in the manner that before the thermoforming, at least one deformable backing web is introduced in the space between the plastic panel and a deep-drawing mold, the deformable backing web consisting of a material which stretches under the conditions of pressure and temperature which occur upon the thermoforming and/or of a material which does not stretch even under the pressure and temperature conditions occurring upon the thermoforming but is deformable on the surface by its intermeshing or change in angular position, and that the pressure and temperature conditions of the thermoforming process are so adjusted that plastic panel and backing web are permanently attached to each other by incorporation of melting together.

The invention proceeds in this connection from the discovery that a distinction may basically be made between two types of material for the backing web which is to be applied.

On the one hand, those materials which under the pressure and temperature conditions occurring during the thermoforming are themselves extendable and stretchable, in which connection the possible limits of the pressure and temperature conditions of both the material of the substrate panel and the backing material can be determined.

Other materials such as, for instance, metals, including metal alloys, or glass or carbon fibers, are as a rule extendable to stretchable only at temperatures which are above the limits of the processing temperature of a substrate plate. For the use of such materials, extendibility or stretchability of the material itself is, however, not necessarily required, inasmuch as backing webs for other uses which are deformable by their surface structure are available or can be produced. There are concerned here, in particular, metal-wire fabrics which are extendable in the surface due to their mesh shape, and metal-wire webs in which the wires are at a predetermined angle to each other and surface stretchability is possible during the processing by change in the angles.

Both types of material can also be present in mixed form, for instance as mixed fabric of cotton having metal wires woven or knitted therein.

Both materials, as well as mixed forms, can be undetachably attached to the substrate panel by the method of the invention if the pressure and temperature conditions of the thermoforming process are so selected that the backing web is incorporated into the substrate panel or melted together with it, in which connection the thermoforming process is preferably deep drawing.

By additional support by compressed air, a better precision in the shaping of the sandwich of plastic panel and backing web is obtained which makes undercuts and 90° bends possible since the sandwich is pressed with considerably greater forces into the deep-drawing mold. This goes hand in hand with a more dependable anchoring of the backing web in the surface of the plastic panel as a result of these greater forces. Furthermore, higher stretching and elongation forces can be exerted on the material or the structure of the backing web, as a result of which the precision in shaping is also improved.

The reliability of the material-locked connection is increased also in the case of backing webs of little or no air permeability.

For backing materials of high permeability such as, for instance, thin textiles in which only a controlled depth of penetration into the surface of the plastic panel is to take place, the method of the invention is particularly suitable, particularly in the case of complex shaping. Depending on the materials used, the method of the invention makes it possible to vary and optimize the parameters, pressing pressure and temperature of the plastic panel, which are causal for the shaping, in particular, of complex mold regions, and for the depth of penetration within a widened range for the pressing pressure. Thus, with the same shapeability, by lower temperature together with higher pressing pressure, the penetration caused by the temperature-dependent flowability can be reduced.

The same is true here for backing materials of metal or other high-strength materials which do not melt together with the plastic panel but adhere by targeted degree of the incorporation.

Apparatus at the present time permit support by compressed air of up to 16 bar, in which connection, a compressed-air support of between 0.5 and 10 bar is preferably used, depending among other things on the size of the molding and the forces occurring thereby.

The method is suitable both for the complete, surface-covering backing of thermomoldings and for the backing of parts of the surface.

By the gentle application of the backing web upon the thermoforming in the pressure range of 0.5 bar to maximum about 10 bar (gauge pressure), excellent quality features, good retention of the soft textile character and good color constancy of the decorative material are obtained.

The above-mentioned possibilities can be supported, in a further development of the invention, in the manner that the backing layer is preheated at least on one side before the deep-drawing process to such an extent that a clear reduction in the modulus of elasticity takes place, i.e. a clearly improved stretchability and extendibility, but no other substantial properties of the material are changed. In other words, the heating should remain, particularly in the case of partially crystalline plastics, below the crystallite melting point (in the case of polypropylenes <130–140° C. and in the case of polyester <220° C.) in order still to assure sufficient constancy of color.

By this at least one-sided heating of the backing web preceding the thermoforming, the result can be obtained that the backing web only now becomes deformable, or its deformability improved so that the backing web rests against the deep-drawing mold without the forming of folds or cracks.

The method is suitable, in particular, for deep drawing with positive or negative mold, possibly with the support of the ejection by upper ram, known in the case of this process.

The method of the invention is particularly advantageous when there are selected for plastic panel and backing web combinations of materials which bind intimately to each other as a result of the pressing pressure which occurs upon the thermoforming, and particularly the deep-drawing process itself and/or the temperatures which occur in this connection. In this way, the application and use of adhesive materials is superfluous, which simplifies both the method of manufacture and the later recycling.

If a surface in the case of which such a combination of materials is not possible is to be produced with the backing web, a multi-ply or multi-layer backing web can also be selected on the side of which facing the plastic panel there is or will be applied a layer of material which binds with the plastic panel upon the deep drawing. In this way, the advantage described for the manufacturing process is retained and the connecting of the materials within the multi-layer backing web can be loosened by other processes upon its manufacture.

By a multi-layer backing web there is understood in this connection the use of an additional intermediate web consisting of a third material, which is particularly advisable when the materials of the plastic panel and of the backing web do not enter into a material-locked connection with each other or only one which is not sufficiently reliable, but both materials enter into such an attachment with the material of the intermediate web.

Independently of this use of an intermediate foil, its use may also be suitable in the case of a wide-mesh backing web in order to prevent a "penetrating" of the material of the plastic panel through the meshes of the backing foil.

If none of the above-indicated possibilities of such combinations is possible due to considerations of cost or other reasons, the backing web can be provided on the side facing the plastic panel with an adhesive so as to obtain an attachment upon the thermoforming, particularly the deep-drawing process.

As materials for the backing layer there are suitable in this connection in particular foils, needled non-wovens, and textiles of all types, particularly of cotton, polyamide, polyester or polypropylene and furthermore TPE or PVC foam foils and cross-linked foam foils having a base of polyurethane, polyethylene or polypropylene. Furthermore, particle foams are suitable, for instance polypropylene particle foams.

The construction of the backing materials such as woven fabric, knitted fabric, machine knitted fabric, weight per unit surface, stretchability, etc. is dependent on the radii desired and the stretching of the material which occurs upon the deep drawing.

As substrate material for the backing there are particularly suitable plastic panels which have a high stiffness (high modulus of elasticity), for instance plastic panels of polypropylene reinforced by glass fibers, natural fibers or talcum, or styrol-acrylonitrile (SAN) reinforced with glass fibers.

For the manufacture of moldings, having increased properties of mechanical loadability and/or temperature resistance, there can advantageously be used backing webs of metal wires or threads or other high-strength materials, in connection with which a significantly better profile of properties can be obtained by suitable angular positions of the wires.

In the case of knitted articles of metal threads or other high-strength materials, the knitted fabric can preferably be made so flexible by suitable design of the stitches that the production of moldings of large three-dimensional deformation is possible.

In a further development of the method of the invention, the backing web consists of an electrically conductive material and is provided with at least one contact element which is accessible after the thermoforming.

The backing with an electrically conductive material makes possible the use of the molding both as electromagnetically screening element with at least one electric contact element for connection to the reference potential and as heatable molding with at least two contact elements, in which connection, depending on the use, a decorative and/or insulating backing can be applied in the same operation simultaneously with the electrically conductive backing as second further backing.

For at least three-layer moldings consisting of the plastic panel, an electrically conductive and in particular metal backing web, and a decorative backing web there are preferably selected combinations of materials which are intimately bonded by the pressing pressure which occurs by itself upon the thermoforming and/or the temperature occurring in this connection. In this way, the electrically conductive, particularly metal backing web is incorporated between two materials which melt together.

The backing web can, in particularly advantageous manner, be fed into the space between mold and plastic panel via a separate clamping frame or endlessly over a system of rollers.

In order to determine the position of the backing web with respect to the molding and prevent an uncontrolled "drawing-in" into the mold, a mechanical fastening is effected of the backing web to the mold or the clamping frame, in which connection the fastening elements, which can be developed for instance as fixed or movably supported needle system which can have yieldability in the direction of the elongations occurring upon the thermoforming, in order to avoid excessive stretching of the material of the backing web upon the forming.

Furthermore, the backing web can be introduced in such a manner that, in the case of a positive mold, it already completely or partially surrounds the mold or in the case of a negative mold it extends entirely or partially into the inside of the mold.

Upon a backing of partial surfaces, corresponding fixing devices are to be provided on or in the mold itself, they permitting an application or insertion in register upon the manufacturing process and assuring a suitable fixing of the edges during the thermoforming process, or the fixing can be effected by separate frame which is also covered by the plastic panel upon the deep drawing and remains in the finished part.

In a special further development of the invention, a plastic panel which already has a backing on the side facing away from the mold is used to produce moldings which are backed on both sides. This can be advantageous, in particular, if the subsequent use of the thermal molding requires both a noise damping effect, which can be obtained by backing with a sound-damping material on one side, and a decorative appearance, which can be obtained by a backing on the other side.

With respect to suitability for recycling, it is particularly advantageous to use substantially the same plastic materials, in particular polypropylene, for substrate material (plastic panel) and backing web. In this way, it is no longer necessary to separate substrate and backing materials on the reprocessing.

Figure 3:
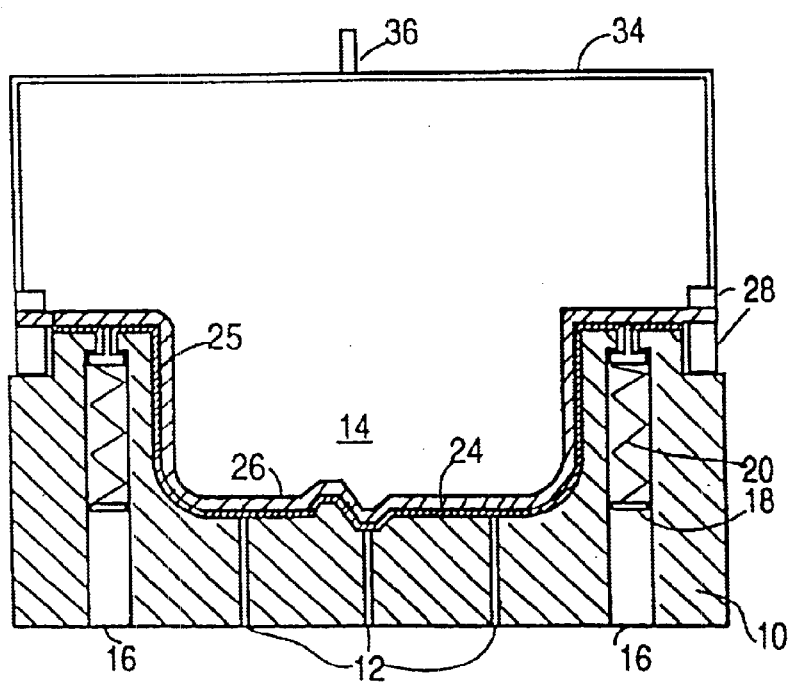
Figure 4:
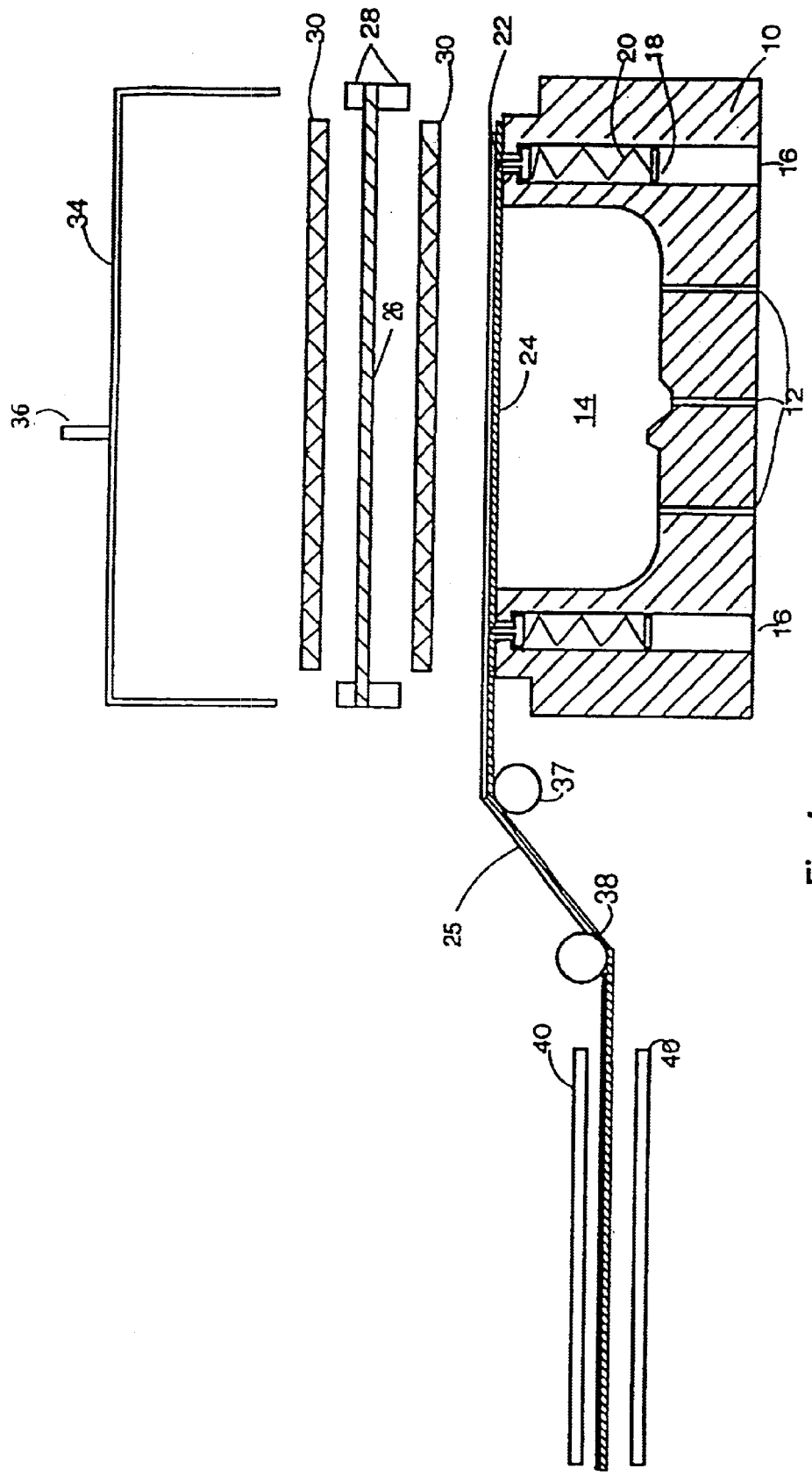
Figure 5:
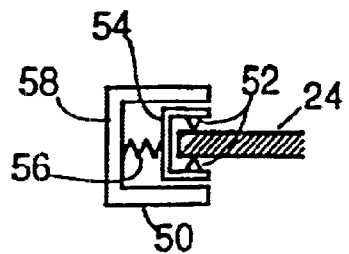
Figure 6A:
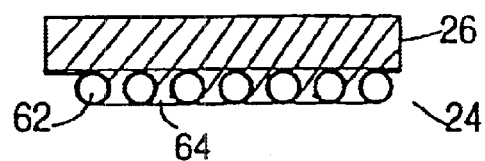
Figure 6B:
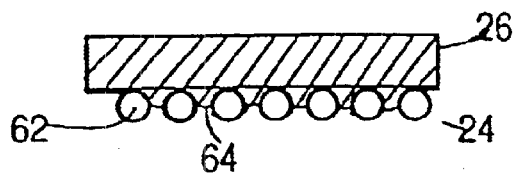
Figure 7:
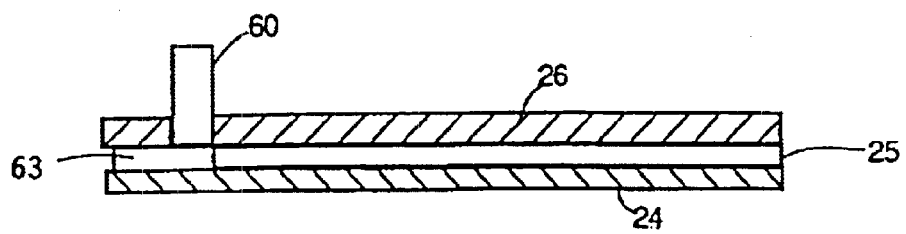

One embodiment of the method of carrying out the invention will be explained in further detail with reference to the drawing. In this connection, FIGS. 1 to 4 show successive phases of the process in a greatly simplified cross section through the mold and the material to be deep drawn. In the drawings FIG. 1 shows the phase of the heating of a plastic panel, FIG. 2 the condition before the deep drawing, FIG. 3 shows the condition after completion of the forming phase, FIG. 4 shows the feeding of the backing web from a roll, FIG. 5 shows a variant of the fixing of the backing web by means of a clamping frame, FIGS. 6a and 6b are an enlarged partial section through a molding consisting of a plastic panel and a backing web, and FIG. 7 is a partial section through a molding with a backing layer with electric contact element.

FIG. 1 shows a greatly simplified cross section through a negative mold 10 with suction channels 12 and a trough-shaped free space 14. A plastic panel 26 clamped in a clamping frame 28, for instance polypropylene reinforced by glass fiber, is heated between two heating elements 30 to a deformation temperature above the crystallite melting point of about 160 to 220° C.

Above the heating elements, there is a pressure bell 34 having a compressed-air connection 36.

A backing web 25, for instance of metallic knitted fabric, is already placed over the trough-shaped free space 14 and is fixed by needles 22 lying symmetrical to the free space by which another backing web 24 of decorative material is also fixed on the deep-drawing mold. These needles 22 are resiliently mounted via springs 20 which rest on disks 18 in bore holes 16 in the negative mold 10.

To the side of this arrangement, there is a preheating device consisting of heating elements 40, between which a backing web 24' of decorative material and a backing web 25' of a knitted metal fabric which is intended for the next thermoformed part are heated.

Figure 2:
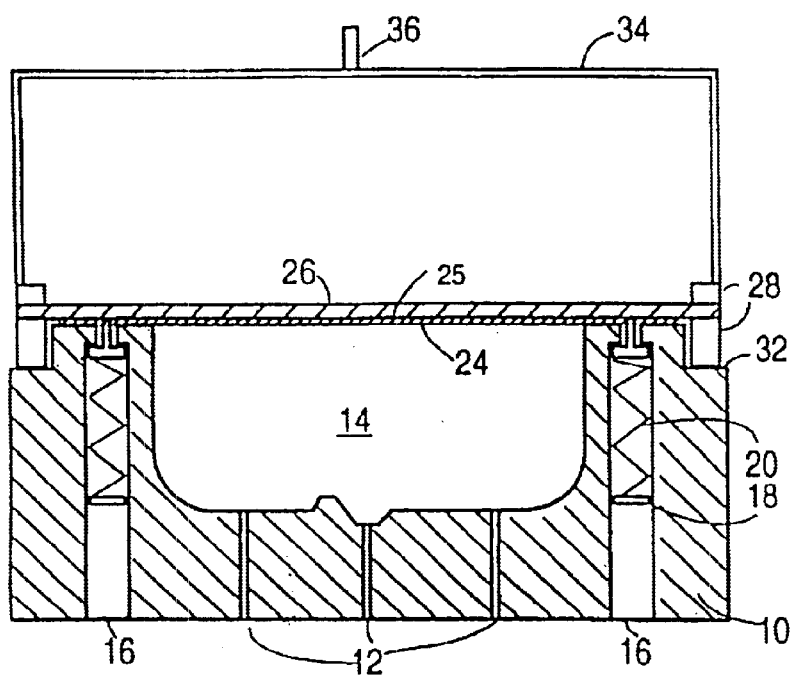

If the forming temperature of the plastic panel 26 is reached, the heating elements 30 present between plastic panel 26, mold 10 and pressure bell 34 are removed and thereupon clamping frames 28 with plastic panel 26, mold 10, and pressure bell 34 are moved towards each other and pressed against each other (FIG. 2). As a result, the mold 10 is moved towards the clamping frame 28. By the pressing, the clamping frame 28 is pressed against a shoulder 32 of the mold 10, the edge of the pressure bell is pressed onto the upper closure of the clamping frame in order to obtain an air-tight closure. This closure can be improved by in each case an interposed packing, not shown.

The trough-shaped free space 14 is now evacuated by the suction channels 12. Synchronized with the evacuation of the free space 14, compressed air is fed via the compressed-air connection 36, and plastic panel 26 and the backing webs 24, 25 are pressed in addition into the mold. The backing webs 24, 25 and the plastic panel 26 are pulled into the mold 10 and pressed until the condition shown in FIG. 3 is reached, in which the backing webs 24, 25 and the deformed plastic panel 26 rest intimately against the inner wall of the mold 10. Upon this deep-drawing process, the backing webs 24, 25 and the deformed plastic panel 26 are connected to each other in material-locked form.

After the customary cooling process, the molding which has thus been backed can be removed and the customary working of the edges and the like effected.

FIG. 4 shows a possible embodiment in which the feeding of the backing webs 24, 25 takes place via a system of rollers 37, 38 from a roll (not shown). As can be noted from FIG. 4, the needle system described in FIG. 1 is used for the fastening prior to the thermoforming. Other feeds/fastenings such as chain systems are also possible.

FIG. 5 shows a variant of the fixing of a backing web in which the backing web is not fixed by a needle system on the form, but is held in a separate clamping frame 50.

Within this clamping frame 50, the backing web 24 is clamped between needles 52 of U-shaped support 54 which springs freely in the clamping frame 50 and which is mounted by a spring 56 against a side wall 58 of the clamping frame 50. By the spring forces of the spring 56, a controlled yielding to the tensile forces occurring upon the thermoforming is made possible and thus a controlled "drawing-in" into the mold.

FIG. 6a shows an enlarged partial section through a molding consisting of a plastic panel and a backing web, in which it is clear that the material of the plastic plate 26 has penetrated very far into the spaces 64 between the meshes 62 of the backing web 24, and thus partially covers the structure of the backing web.

Thus, a practically permanent connection is established in the case of a backing web consisting of a material which adheres only by inclusion.

Oh the other hand, if this covering is undesired since a decorative backing is concerned and/or the materials used can at least partially melt together, the penetration can be reduced to an extent such as shown in FIG. 6b by the use of a lower temperature of the plastic panel with at the same time a higher pressure.

FIG. 7 is a partial section through a molding having a backing web 25 with an electric contact element 60. The electrically conductive backing web 25 is in this example enclosed between a decorative and/or electrically insulating backing web 24 and a plastic panel 26. Insofar as possible and necessary, the electrically conductive backing web 25 is connected with an electrically conductive foil 63 in order to permit a surface contacting of the, for instance, knitted backing web. Mechanically and electrically connected to this current-conduction foil 63, the contact element 60, which may be a plug, a bushing, a solder lug or other shape suitable for electrical contacting, extends beyond the surrounding surface of the plastic panel 26. Depending on the plastic panel used and the shape of the contact element, it can penetrate through the plastic panel upon the deep drawing so that in a subsequent operation only plastic material which still adheres need be removed, or a "cap" is formed over the contact, which cap must, if necessary be removed.

Of course, the contact element can in the same way also be so arranged that it passes through the decorative backing web.

What is claimed is:

1. A method of manufacturing a thermomolding, which comprises: thermoforming a plastic panel of one of a heat-deformable, thermoplastic resin, a resin mixture, and a resin matrix, and at least one deformable backing web; inserting the backing web into a space between the plastic panel and a deep-drawing mold prior to thermoforming; holding the plastic panel by a support frame during thermoforming and holding the backing web by a fixing means during thermoforming so that the plastic panel and backing web have surfaces that lay together; providing that the deformable backing web consists of one of (1) a material which stretches under the conditions of pressure and temperature occurring upon thermoforming, and (2) a material which does not stretch under the pressure and temperature conditions occurring upon thermoforming but is deformable on its surface by an intermeshing or change in angular position; and including the steps of adjusting the pressure and temperature conditions of the thermoforming so that the plastic panel and the backing web are undetachably connected to each other directly by one of incorporation and melting together, and increasing the pressing pressure by additional compressed-air support, wherein said panel and backing web are flat before said thermoforming and have surfaces that lay together flat before said thermoforming, and including the steps of removing air from the deep drawing mold under the panel and synchronizing said air removal with feeding compressed air into a closed cavity over said panel.

2. A method according to claim 1, wherein the thermomolding is produced by deep drawing.

3. A method according to claim 1, wherein the backing web is at least one of (1) fed over a separate clamping means, and (2) fed in an endless manner via a system of rollers.

4. A method according to claim 1, wherein the backing web is one of (1) fixed mechanically on the mold, and (2) fixed with respect to the support frame, and wherein the fixing elements have yieldability in the direction of the elongation occurring upon thermoforming.

5. A method according to claim 1, wherein said plastic panel has a backing on the side facing away from the mold.

6. A method according to claim 1, wherein said backing web is multi-layer or multi-ply.

7. A method according to claim 1, wherein a separate frame is used for fixing the backing web for a partial backing of a thermomolding, which separate frame is inserted with the backing web fastened on it into the deep-draw mold and is covered in a form-locked manner by the plastic panel during the deep-drawing process.

8. A method according to claim 1, wherein said plastic panel is selected from the group consisting of a plastic panel of polypropylene reinforced with glass fibers, a plastic panel of polypropylene reinforced with talcum, a plastic panel of polypropylene reinforced with natural fibers, and formed polypropylene.

9. A method according to claim 1, wherein said plastic panel is styrol-acrylonitrile reinforced with glass fibers.

10. A method according to claim 1, wherein said panel and the backing web are stretchable under the pressure and temperature conditions occurring upon said thermoforming, and there are used combinations of materials which intimately bind to each other by the pressing pressure which occurs upon at least one of (1) the compressed air supported deep-drawing process, and (2) the temperatures occurring in said deep drawing.

11. A method according to claim 1, wherein said backing web is selected from the group consisting of foils, needled non-wovens and textiles.

12. A method according to claim 11, wherein said backing web is selected from the group consisting of cotton, polyamide, polyester polypropylene, polyethylene, PVC foamed foils, foam foils having a base of polyurethane, foam foils having a base of polyethylene, foam foils having a base of polypropylene, and particle foams.

13. A method according to claim 1, wherein said backing web is stretchable under the pressure and temperature conditions occurring upon said thermoforming, and including the step of pre-heating the backing web at least on one side thereof to such an extent that before the deep-drawing process there is a clear reduction of the modulus of elasticity, but no other substantial properties of the material are changed.

14. A method according to claim 1, wherein the material of said backing web does not itself stretch under the pressure and temperature conditions occurring upon the thermoforming, and wherein there are used as webs plastic with high-strength materials added thereto selected from the group consisting of metal, wires, threads, fibers and after-expanding material.

15. A method according to claim 14, wherein a knitted article is used as the backing web of high-strength material made flexible by mesh construction.

16. A method according to claim 15, wherein a knitted wire fabric is used as the backing web with a single layer or multi-layer foil.

17. A method according to claim 14, including the use of metal reinforcement of the backing web.

18. A method according to claim 1, wherein an electrically conductive backing web is used which is provided with a contact element which is accessible after the thermoforming.

19. A method according to claim 18, wherein moldings which can be heated by the application of voltage are produced.

20. A method according to claim 19, wherein said electrically conductive backing web is a knitted metal fabric.

21. A method according to claim 1 including the preparation of at least three-layer moldings employing materials that intimately bind to each other by at least one of the pressing pressure occurring on the thermoforming itself and the temperatures occurring in said thermoforming.

* * * * *